US012640124B2

(12) United States Patent
Morita

(10) Patent No.: US 12,640,124 B2
(45) Date of Patent: May 26, 2026

(54) ELASTIC BODY, HEAD, PERCUSSION INSTRUMENT, AND ATTACHMENT METHOD OF ELASTIC BODY

(71) Applicant: Roland Corporation, Shizuoka (JP)

(72) Inventor: Yutaka Morita, Shizuoka (JP)

(73) Assignee: Roland Corporation, Shizuoka (JP)

( * ) Notice: Subject to any disclaimer, the term of this patent is extended or adjusted under 35 U.S.C. 154(b) by 235 days.

(21) Appl. No.: 18/504,128

(22) Filed: Nov. 7, 2023

(65) Prior Publication Data

US 2025/0078785 A1 Mar. 6, 2025

Related U.S. Application Data

(63) Continuation of application No. PCT/JP2023/031016, filed on Aug. 28, 2023.

(51) Int. Cl.
*G10D 13/02* (2020.01)
*G10D 13/20* (2020.01)

(52) U.S. Cl.
CPC ............ *G10D 13/02* (2013.01); *G10D 13/20* (2020.02)

(58) Field of Classification Search
None
See application file for complete search history.

(56) References Cited

U.S. PATENT DOCUMENTS

2007/0234886 A1* 10/2007 Matsuyuki ............ G10H 3/146 84/723
2019/0266989 A1* 8/2019 Yoshino .................. G10H 1/32

FOREIGN PATENT DOCUMENTS

JP 2014130373 7/2014
JP 2015064553 4/2015
JP 2016177003 10/2016
JP 2017068131 4/2017
JP 2019148623 9/2019
WO 2017056993 4/2017

OTHER PUBLICATIONS

"International Search Report (Form PCT/ISA/210) of PCT/JP2023/031016," mailed on Nov. 7, 2023, with English translation thereof, pp. 1-4.
"Written Opinion of the International Searching Authority (Form PCT/ISA/237) of PCT/JP2023/031016," mailed on Nov. 7, 2023, with English translation thereof, pp. 1-6.

* cited by examiner

*Primary Examiner* — Patrick Mcatee
(74) *Attorney, Agent, or Firm* — JCIPRNET

(57) ABSTRACT

An elastic body is attached to a percussion instrument including a body part and a head, the body part having an opening on an upper end side thereof, the head covering the opening of the body part and having attachment holes formed therein. The elastic body includes: a struck part, arranged on an upper surface of the head; insertion parts, protruding downward from the struck part; and a hook part, formed to expand from the insertion parts. In a state in which the insertion parts are inserted into the attachment holes of the head, the hook part is hooked to a lower surface of the head.

18 Claims, 4 Drawing Sheets

ELASTIC BODY, HEAD, PERCUSSION INSTRUMENT, AND ATTACHMENT METHOD OF ELASTIC BODY

CROSS-REFERENCE TO RELATED APPLICATION

This application is a continuation of PCT International Application No. PCT/JP2023/031016, filed on Aug. 28, 2023. The above application is hereby expressly incorporated by reference, in its entirety, into the present application.

BACKGROUND

Technical Field

The disclosure relates to an elastic body, a head, a percussion instrument, and an attachment method of an elastic body, particularly to an elastic body, a head, a percussion instrument, and an attachment method of an elastic body which make it possible to reduce the size of a percussion instrument.

Related Art

A percussion instrument is known in which an upper surface (striking surface) of a head is surrounded by an elastic body. For example, Japanese Patent Laid-Open No. 2019-148623 describes a rim 5 (elastic body) that includes a struck part 50 of an annular shape and a plurality of clamped parts 51 formed on an outer peripheral surface of the struck part 50. In this technology, a plurality of accommodation parts 40*a* for accommodating the clamped parts 51 of the rim 5 are formed on an inner peripheral surface of a hoop 4.

With the clamped parts 51 fitted into the accommodation parts 40*a*, by applying tension to a head 3 by the hoop 4 (fixing the hoop 4 to a body part 2), the rim 5 is attached to an upper surface of the head 3. In this attached state, since the upper surface (striking surface) of the head 3 is surrounded by the struck part 50 of the rim 5, a performance simulating a rimshot can be performed by striking the struck part 50.

However, in the conventional technology described above, a recess (accommodation part 40*a*) for attaching the elastic body needs to be formed on the inner peripheral surface of the hoop. In order to ensure a strength of the hoop while forming such a recess, it is necessary to increase a radial thickness of the hoop, thus posing a problem that the percussion instrument is increased in size.

SUMMARY

An elastic body of the disclosure is an elastic body attached to a percussion instrument. The percussion instrument includes a body part having an opening on an upper end side thereof and a head covering the opening of the body part, in which a plurality of attachment holes are formed in the head. The elastic body includes a struck part arranged on an upper surface of the head, a plurality of insertion parts protruding downward from the struck part, and a hook part formed to expand from the insertion part. The insertion part is inserted into the attachment hole to thereby attach the struck part to the head, and in the attached state of the struck part to the head, the hook part is hooked to a lower surface of the head.

A head of the disclosure is a head that is attached to a percussion instrument including a body part having an opening on an upper end side thereof and covers the opening of the body part. The head includes a plurality of attachment holes. The head is able to attach an elastic body including: a struck part, arranged on an upper surface of the head; a plurality of insertion parts, protruding downward from the struck part and inserted into the attachment hole; and a hook part, formed to expand from the insertion part and hooked to a lower surface of the head.

A percussion instrument of the disclosure includes: a body part, having an opening on an upper end side thereof; a head, covering the opening of the body part and having a plurality of attachment holes formed therein; and an elastic body. The elastic body includes: a struck part, arranged on an upper surface of the head; a plurality of insertion parts, protruding downward from the struck part; and a hook part, formed to expand from the insertion part. The insertion part is inserted into the attachment hole to thereby attach the struck part to the head, and in the attached state of the struck part to the head, the hook part is hooked to a lower surface of the head.

An attachment method of an elastic body of the disclosure is an attachment method of an elastic body in a percussion instrument. The percussion instrument includes: a body part, having an opening on an upper end side thereof; a head, covering the opening of the body part; and the elastic body attached to the head. The elastic body includes: a struck part, arranged on an upper surface of the head; a plurality of insertion parts, protruding downward from the struck part; and a hook part, formed to expand from the insertion part. In the attachment method of the elastic body, by inserting the insertion part into a plurality of attachment holes formed in the head, the hook part is hooked to a lower surface of the head.

DESCRIPTION OF THE EMBODIMENTS

The disclosure provides an elastic body, a head, a percussion instrument, and an attachment method of an elastic body which make it possible to reduce the size of a percussion instrument.

Figure 1:
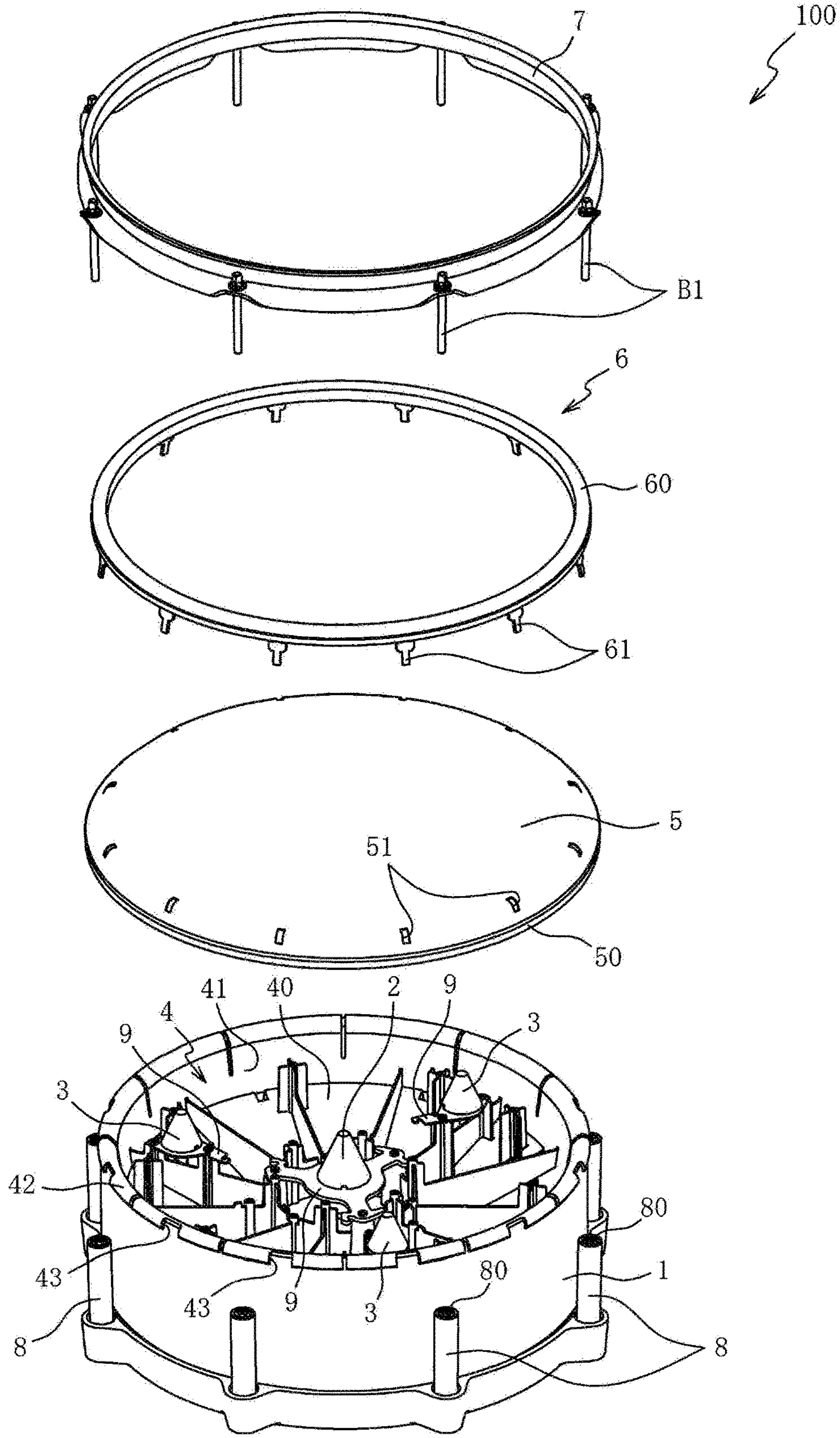
FIG. 1 is an exploded perspective view of a percussion instrument according to one embodiment.

Hereinafter, embodiments are described with reference to the accompanying drawings. First, an overall configuration of a percussion instrument 100 is described with reference to FIG. 1. FIG. 1 is an exploded perspective view of the percussion instrument 100 according to one embodiment.

As illustrated in FIG. 1, the percussion instrument 100 is an electronic percussion instrument simulating an acoustic drum, and includes a shell 1 constituting a housing thereof. The shell 1 is formed in a cylindrical shape using metal, wood, or resin. In the following description, a direction around an axis of the shell 1 will be described as a circumferential direction, and a direction orthogonal to the axis of the shell 1 will be described as a radial direction. A frame 4 that supports a central sensor 2 and a peripheral sensor 3 is hooked to an upper edge portion of the shell 1.

The frame 4 includes a bottom 40 of a substantially disk shape, a sidewall 41 rising upward from an outer edge of the bottom 40, and a curved part 42 formed at an upper edge of the sidewall 41. The parts 40 to 42 are integrally formed using a resin material.

The sidewall 41 of the frame 4 is formed in a tubular shape surrounding the entire circumference of the bottom 40. The curved part 42 is curved from the upper edge of the sidewall 41 toward an outer peripheral side. The curved part 42 is formed in an arc shape (convex upward) along the upper edge of the shell 1. By the curved part 42 being hooked to the upper edge of the shell 1, the frame 4 is supported on an inner peripheral side of the shell 1.

An opening portion on an upper end side of the frame 4 (shell 1) is covered by a head 5. The head 5 is formed in a disk shape using a mesh in which synthetic fibers are knitted. A head frame 50 of an annular shape is fixed to an outer edge of the head 5. The head frame 50 is formed using a resin material, and the head 5 and the head frame 50 are integrally molded by die molding. The head frame 50 may be formed using a material (for example, metal such as aluminum or iron) other than resin, and the head frame 50 may be joined to the head 5 by adhesion or the like.

A plurality of (twelve in the present embodiment) attachment holes 51 of a rectangular shape are formed at equal circumferential intervals in a portion on the outer edge side of the head 5. A rubber hoop 6 is attached to the head 5 using the attachment hole 51.

The rubber hoop 6 includes a struck part 60 of an annular shape surrounding an upper surface (striking surface) of the head 5, and a plurality of (twelve in the present embodiment) anchors 61 protruding downward from the struck part 60. The struck part 60 and the anchor 61 are integrally formed using rubber.

The plurality of anchors 61 are arranged side by side at equal circumferential intervals (in positions corresponding to the plurality of attachment holes 51). By fitting these anchors 61 into the attachment holes 51, the rubber hoop 6 is attached to the head 5.

The head 5 is fixed to the percussion instrument 100 (housing) by a hoop 7 of an annular shape. In the hoop 7, through holes (not illustrated) for inserting a tension bolt B1 are formed at equal circumferential intervals. On an outer peripheral side of the shell 1 (housing), a plurality of (eight in the present embodiment) lugs 8 for fastening the tension bolt B1 are provided at equal circumferential intervals.

A vertically extending female screw hole 80 is formed in the lug 8. With the head frame 50 of the head 5 hooked to the hoop 7, by fastening the tension bolt B1 into the female screw hole 80 of the lug 8, tension is applied to the head 5. Accordingly, the upper surface of the head 5 serves as the striking surface, and vibration of a strike on this striking surface is detected by the central sensor 2 and the peripheral sensor 3.

One central sensor 2 is supported in the center of the bottom 40 of the frame 4. A plurality of (three in the present embodiment) peripheral sensors 3 arranged side by side at equal circumferential intervals are supported on the outer edge side of the bottom 40. These sensors 2 and 3 are attached to a plate 9 fixed to the bottom 40 of the frame 4.

A sensor (piezoelectric element, not illustrated) of a disk shape is adhered to an upper surface of the plate 9 by a double-sided tape (not illustrated) having cushioning properties, and a cushion is adhered to an upper surface of this sensor. The double-sided tape, the sensor and the cushion constitute the central sensor 2 and the peripheral sensor 3. The cushion of the central sensor 2 and the peripheral sensor 3 is a cushioning material of a truncated cone shape and formed of a flexible material such as sponge, or rubber, or thermoplastic elastomer. The cushion contacts a lower surface of the head 5.

Although not illustrated, a rim sensor (piezoelectric element of a disk shape) for detecting a strike on the rubber hoop 6 is adhered to a lower surface of the plate 9 which supports the central sensor 2. When vibration is detected by the rim sensor, the central sensor 2 and the peripheral sensor 3, a musical tone signal based on a detection result thereof is generated by a sound source (not illustrated). The musical tone signal is outputted to an amplifier or a speaker (both not illustrated), and an electronic musical tone is thereby emitted from the speaker.

Figure 2:
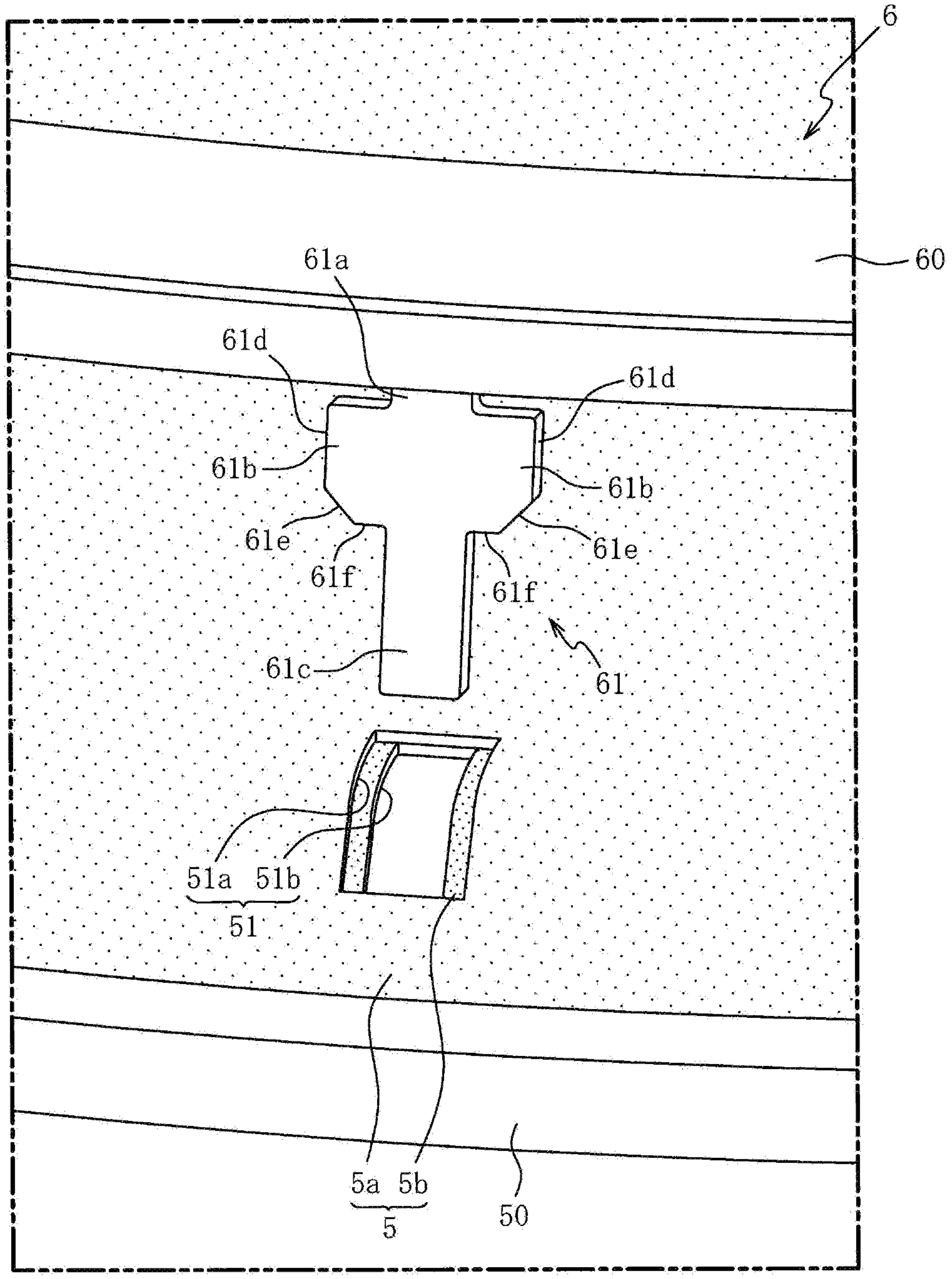
FIG. 2 is a partially enlarged perspective view of a head and a rubber hoop.
Figure 3:
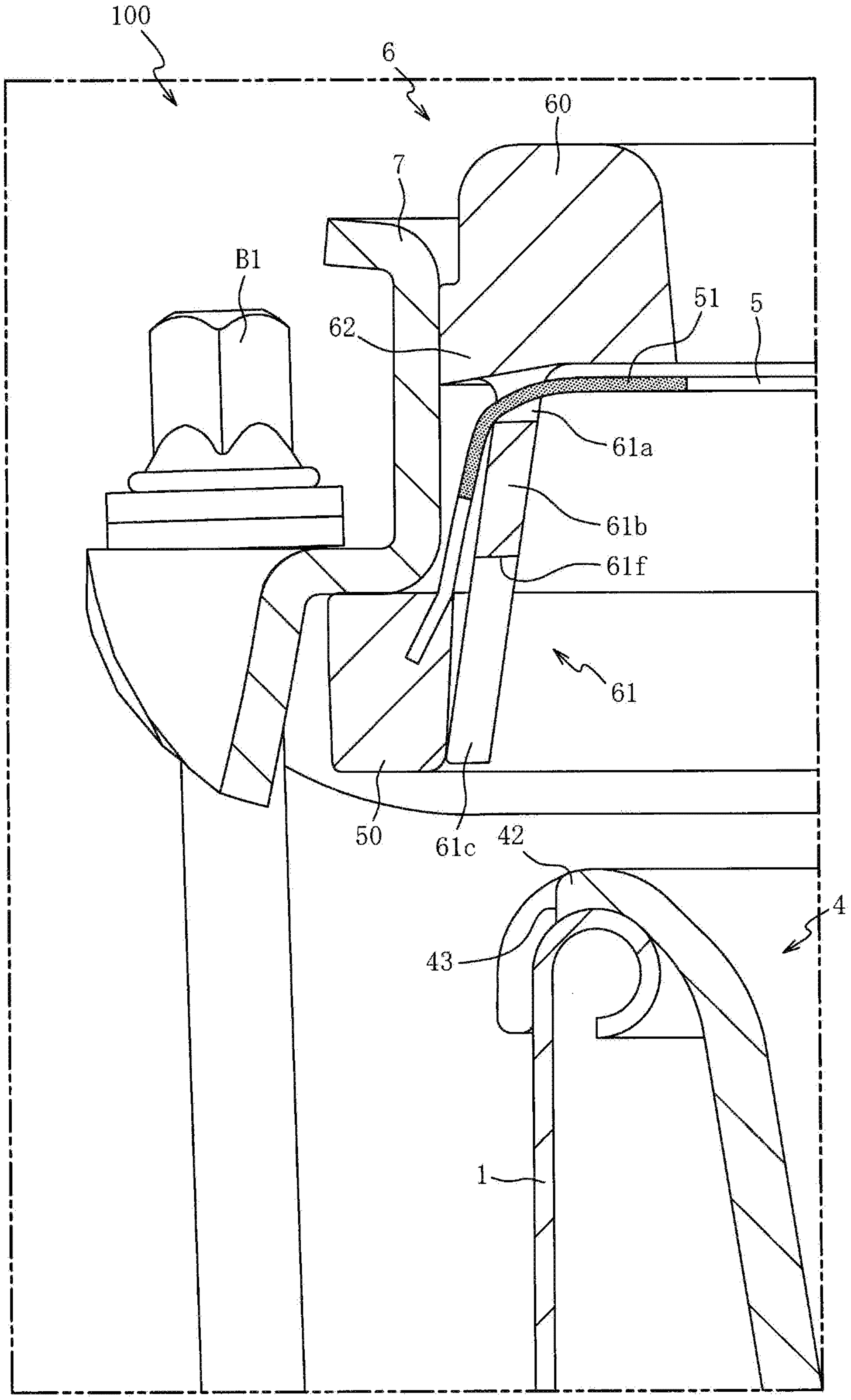
FIG. 3 is a partially enlarged cross-sectional view of the percussion instrument, illustrating how the head and the rubber hoop are attached to an upper end portion of a shell.

Next, a detailed configuration of the head 5 and the rubber hoop 6 is described with reference to FIG. 2 and FIG. 3. FIG. 2 is a partially enlarged perspective view of the head 5 and the rubber hoop 6. FIG. 3 is a partially enlarged cross-sectional view of the percussion instrument 100, illustrating how the head 5 and the rubber hoop 6 are attached to an upper end portion of the shell 1. In FIG. 2, dot-like hatching is applied to a surface of the head 5 (upper head 5*a* and lower head 5*b*).

FIG. 3 illustrates a cross section (that is, a cross section not including the attachment hole 51) cut along a plane including the axis of the shell 1 and including a hook part 61*b* (see FIG. 2) of the anchor 61. While hatching is applied to a region of the head 5 where the attachment hole 51 is formed, hatching of the cross section of the head 5 is omitted. As illustrated in FIG. 2, the head 5 is composed of the upper head 5*a* and the lower head 5*b*. However, in FIG. 3, one head 5 is illustrated to simplify the drawing (and the same applies to FIG. 4 described later).

As illustrated in FIG. 2, the head 5 is composed of the upper head 5*a* whose upper surface serves as the striking surface, and the lower head 5*b* laid under the upper head 5*a*. Similarly, the attachment hole 51 is composed of an attachment hole 51*a* formed in the upper head 5*a* and an attachment hole 51*b* formed in the lower head 5*b*. While the attachment hole 51*b* is formed to have a smaller opening dimension (opening width) than the attachment hole 51*a* in the circumferential direction, the attachment holes 51*a* and 51*b* have the same opening dimension (opening length) in the radial direction.

As illustrated in FIG. 2 and FIG. 3, the anchor 61 includes: an insertion part 61*a*, protruding downward from a lower surface of the struck part 60; the hook part 61*b*, expanding from the insertion part 61*a* to both circumferential sides (having a larger circumferential dimension than the insertion part 61*a*); and a protruding part 61*c*, protruding further downward from the hook part 61*b*. These parts 61*a* to 61*c* are formed integrally with the struck part 60.

Each of the parts 61*a* to 61*c* of the anchor 61 is formed in a plate shape in which a dimension (plate thickness) in the radial direction is smaller than a dimension (width) in the circumferential direction. The dimension of the insertion part 61*a* and the protruding part 61*c* in the circumferential direction is formed to be the same (or slightly smaller) than the opening dimension of the attachment hole 51*b* in the circumferential direction.

When the rubber hoop 6 is attached to the heads 5*a* and 5*b*, first, the protruding part 61*c* of the anchor 61 is inserted into the attachment holes 51*a* and 51*b*. Since the dimension (width) of the hook part 61*b* in the circumferential direction is larger than the opening dimension of the attachment holes 51*a* and 51*b* in the circumferential direction, when the protruding part 61*c* is inserted into the attachment holes 51*a* and 51*b*, a state is reached in which the hook part 61*b* is hooked to the heads 5*a* and 5*b*.

In this state, by further pulling the protruding part 61*c* downward or twisting and pulling the protruding part 61*c* downward, the hook part 61*b* passes through the attachment holes 51*a* and 51*b*. By passing the entire hook part 61*b* through the attachment holes 51*a* and 51*b*, the insertion part 61*a* is inserted into the attachment holes 51*a* and 51*b*, and the hook part 61*b* is hooked to the lower surface of the head 5 (lower head 5*b*) (see FIG. 3). By fitting all the anchors 61 into each attachment hole 51 (see FIG. 1) arranged side by side in the circumferential direction, attachment of the rubber hoop 6 to the head 5 is completed.

In this way, in the present embodiment, in the state in which the insertion part 61*a* is inserted into the plurality of attachment holes 51 of the head 5, the hook part 61*b* is hooked to the lower surface of the head 5. Thus, while the need to form a recess in the hoop 7 for hooking the rubber hoop 6 as in the conventional technology is eliminated, the rubber hoop 6 (struck part 60) can be attached to the upper surface of the head 5. Accordingly, the thickness of the hoop 7 in the radial direction can be reduced, and the percussion instrument 100 can thus be reduced in size. Since the amount of material used in molding the hoop 7 can be reduced, the manufacturing cost of the hoop 7 can also be reduced. Furthermore, the rubber hoop 6 can be attached to the percussion instrument 100 which includes the existing hoop 7 that does not have the recess as in the conventional technology. That is, the rubber hoop 6 can be attached to the percussion instrument 100 (electronic drum) having a design and structure similar to those of an acoustic drum, or can be attached to an acoustic drum itself.

Here, even in a configuration where, for example, the protruding part 61*c* of the anchor 61 is omitted, it is possible to hook the hook part 61*b* to the lower surface of the head 5 (lower head 5*b*). However, in such a configuration, it takes time and effort to insert (fit) the hook part 61*b* into the attachment holes 51*a* and 51*b*.

In contrast, in the present embodiment, the protruding part 61*c* is provided protruding downward from the hook part 61*b*. Accordingly, as described above, with the protruding part 61*c* inserted into the attachment holes 51*a* and 51*b*, by further pulling (or twisting) the protruding part 61*c* downward, the hook part 61*b* can be guided to be inserted into the attachment holes 51*a* and 51*b*. Accordingly, work efficiency of attaching the rubber hoop 6 to the head 5 can be improved.

In each hook part 61*b* expanding from the protruding part 61*c* to both circumferential sides, an inclined plane 61*e* is formed to be inclined so that a lower end of a side surface 61*d* (see FIG. 2) of the hook part 61*b* facing the circumferential direction is obliquely notched. The inclined plane 61*e* is a plane inclined upward from a lower surface 61*f* toward the side surface 61*d* of the hook part 61*b*.

In this way, since the hook part 61*b* is formed in a tapered shape as approaching a lower end side thereof, when the hook part 61*b* (inclined plane 61*e*) passes through the attachment holes 51*a* and 51*b*, the head 5 (the heads 5*a* and 5*b*) is deformed so as to widen the attachment holes 51*a* and 51*b*. Accordingly, since the hook part 61*b* can be easily fitted into the attachment holes 51*a* and 51*b*, the work efficiency of attaching the rubber hoop 6 to the head 5 can be improved.

Here, during manufacture of the head 5, the upper head 5*a* and the lower head 5*b* in an overlapping state are set in a die (not illustrated). In this state, the head frame 50 made of resin is integrally molded on the outer edge of the heads 5*a* and 5*b*. Since the manufacture of the head 5 by die molding may adopt a known method, a detailed description thereof will be omitted. Examples of a known manufacturing method include a method described in Japanese Patent Laid-Open No. 2015-064553 (for example, see FIG. 18 thereof).

It is also possible that the attachment holes 51*a* and 51*b* of the heads 5*a* and 5*b* are formed after such die molding. However, after die molding of the head 5, the upper head 5*a* and the lower head 5*b* have a dome shape bulging upward from the head frame 50. Thus, it becomes difficult to form the attachment holes 51*a* and 51*b* in a shape as designed.

Accordingly, in the present embodiment, a method is adopted in which the head frame 50 is integrally molded after the attachment holes 51*a* and 51*b* are formed in advance in the upper head 5*a* and the lower head 5*b*. Accordingly, since the attachment holes 51*a* and 51*b* can be formed with the heads 5*a* and 5*b* flattened, the attachment holes 51*a* and 51*b* can be formed in the shape as designed.

Since the head 5 is a mesh in which synthetic fibers are knitted, when the attachment holes 51*a* and 51*b* are formed by a knife, the fibers may fray at a portion (edge of the attachment holes 51*a* and 51*b*) where the head 5 is cut. Accordingly, in the present embodiment, the attachment holes 51*a* and 51*b* are formed in the head 5 by heat treatment such as laser cutting. Accordingly, the fibers at the portion (edge of the attachment holes 51*a* and 51*b*) where the head 5 is cut can be fused together, and fraying of the fibers as described above can thus be suppressed.

In this way, in the case of forming the attachment holes 51*a* and 51*b* by heat treatment such as laser cutting, for example, if the attachment holes 51*a* and 51*b* are formed with the upper head 5*a* and the lower head 5*b* overlapping each other, the upper head 5*a* and the lower head 5*b* may be fused together. If the upper head 5*a* and the lower head 5*b* are fused together, since vibration of the heads 5*a* and 5*b* is hindered by a portion where the fusion occurs, the vibration generated when the upper head 5*a* is struck cannot be efficiently transmitted to the sensors 2 and 3 (see FIG. 1).

In contrast, in the present embodiment, as described above, the method is adopted in which the head frame 50 is integrally molded after the attachment holes 51*a* and 51*b* are formed (separately) in advance in the upper head 5*a* and the lower head 5*b*. Accordingly, even if the attachment holes 51*a* and 51*b* are formed by heat treatment such as laser cutting, the upper head 5*a* and the lower head 5*b* can be prevented from being fused together. Thus, the vibration generated when the upper head 5*a* is struck is likely to be transmitted to the sensors 2 and 3 (see FIG. 1).

On the other hand, in the case where the attachment holes 51*a* and 51*b* are formed in advance in the upper head 5*a* and the lower head 5*b*, the relative positions of the upper and lower attachment holes 51*a* and 51*b* may shift during, for example, the die molding described above. In such a case where the relative positions shift, if the opening widths of the attachment holes 51*a* and 51*b* are of the same size, since a portion of or the whole of the attachment holes 51*a* and 51*b* may be blocked, the anchor 61 cannot be properly fitted into the attachment holes 51*a* and 51*b*.

In contrast, in the present embodiment, since the attachment hole 51*a* of the upper head 5*a* is formed larger than the attachment hole 51*b* of the lower head 5*b*, even if the relative positions of the upper and lower attachment holes 51*a* and

51*b* shift, the attachment hole 51*b* can be prevented from being blocked. Accordingly, the anchor 61 can be properly fitted into the attachment holes 51*a* and 51*b*.

In this way, in the case of aiming to prevent the attachment holes 51*a* and 51*b* from being blocked, it is also possible to, for example, form the attachment hole 51*b* of the lower head 5*b* to be larger than the attachment hole 51*a* of the upper head 5*a*. However, the larger the opening dimension of the attachment holes 51*a* and 51*b*, the more likely the vibration of the heads 5*a* and 5*b* is to be hindered. Thus, if the attachment hole 51*b* of the lower head 5*b* contacted by the sensors 2 and 3 (see FIG. 1) is enlarged, there is a risk that the vibration generated when the upper head 5*a* is struck may become less likely to be properly transmitted to the sensors 2 and 3.

In contrast, in the present embodiment, the attachment hole 51*a* of the upper head 5*a* is formed larger than the attachment hole 51*b* of the lower head 5*b*. Thus, while the attachment holes 51*a* and 51*b* are prevented from being blocked due to shifting of relative positions as described above, the attachment hole 51*b* of the lower head 5*b* contacted by the sensors 2 and 3 can be formed relatively small. Accordingly, since vibration of the lower head 5*b* can be prevented from being hindered by the attachment hole 51*b*, the vibration generated when the upper head 5*a* is struck can be efficiently transmitted to the sensors 2 and 3 via the lower head 5*b*.

Figure 4:
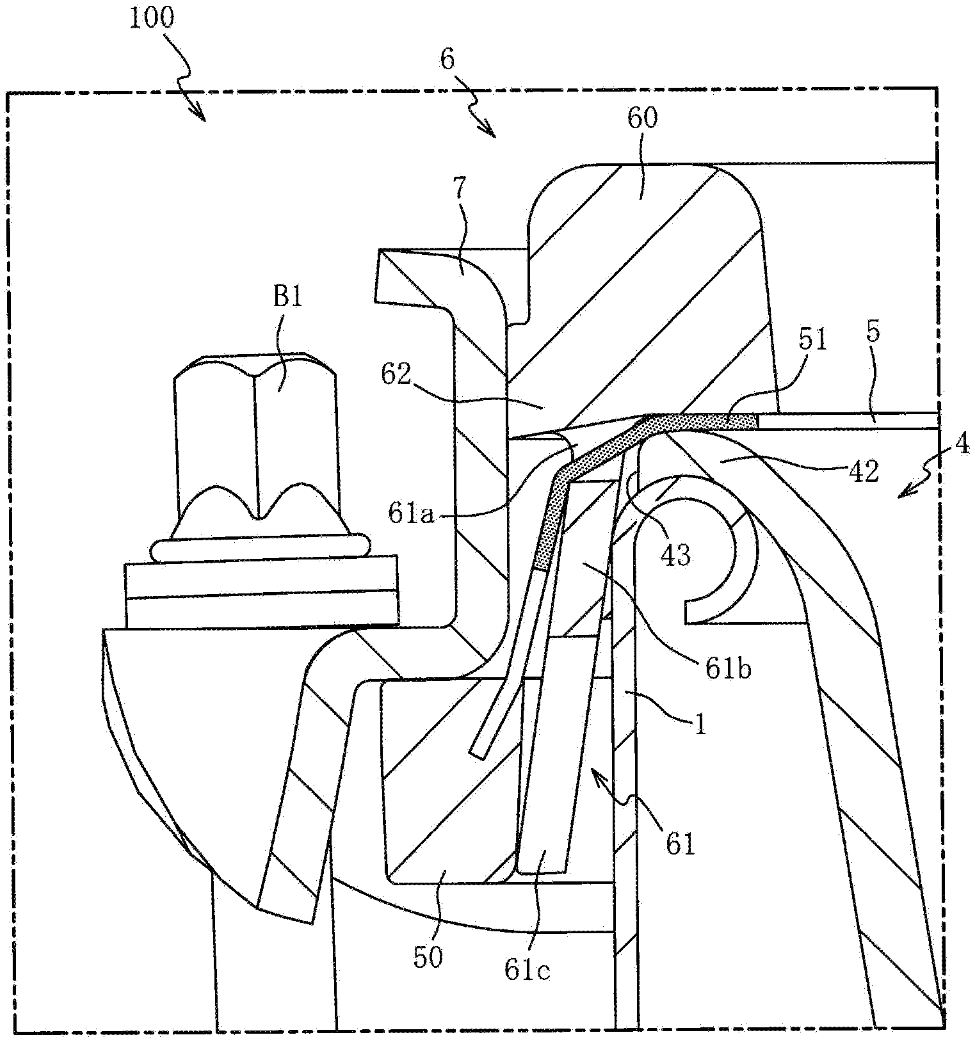
FIG. 4 is a partially enlarged cross-sectional view of the percussion instrument, illustrating a state in which the head and the rubber hoop have been attached to the upper end portion of the shell from the state of FIG. 3.

Next, a configuration of the percussion instrument 100 is further described with reference to FIG. 3 and FIG. 4. FIG. 4 is a partially enlarged cross-sectional view of the percussion instrument 100, illustrating a state in which the head 5 and the rubber hoop 6 have been attached to the upper end portion of the shell 1 (tension has been applied to the head 5) from the state of FIG. 3.

As illustrated in FIG. 3 and FIG. 4, when the head 5 is attached to the shell 1, the head 5 is placed on the upper end portion of the shell 1 in a state in which the anchor 61 (hook part 61*b* and protruding part 61*c*) of the rubber hoop 6 inserted into the attachment hole 51 is located on the outer peripheral side of the shell 1. In this state, by fastening the tension bolt B1 inserted into the hoop 7 to the lug 8 (see FIG. 1), the head frame 50 is pressed downward and tension is applied to the head 5. Accordingly, attachment of the head 5 and the rubber hoop 6 to the shell 1 (body part of the percussion instrument 100) is completed.

In the state in which the head 5 (rubber hoop 6) is attached to the shell 1, the struck part 60 is supported by the shell 1 via the curved part 42 of the frame 4 and the head 5, and the upper surface (striking surface) of the head 5 is surrounded by the struck part 60. Since an upper end of the struck part 60 is located above an upper end of the hoop 7, by striking the struck part 60, a performer is able to perform a performance simulating a rimshot.

In this way, in the case of aiming to surround the striking surface with the struck part 60 arranged on an inner peripheral side of the hoop 7, for example, it is also possible to fit the anchor 61 into the attachment hole 51 of the head 5 formed on the inner peripheral side of the shell 1.

However, in the configuration in which the attachment hole 51 is formed on the inner peripheral side of the shell 1, if the anchor 61 is fitted into the attachment hole 51, a state is reached in which the hook part 61*b* is simply hooked to the lower surface of the head 5. Thus, an impact of a strike on the struck part 60 may cause the struck part 60 to rattle, or may cause the struck part 60 to easily skid relative to the head 5.

In order to suppress such an unstable operation of the struck part 60, it is necessary to make a gap (length of the insertion part 61*a*) between the struck part 60 and the hook part 61*b* almost the same as a thickness (about 0.7 mm) of the head 5, and to sandwich the head 5 without any gap between the struck part 60 and the hook part 61*b*. If the gap between the struck part 60 and the hook part 61*b* is narrowed to be about the same as the thickness of the head 5, it becomes difficult to mold the rubber hoop 6 with a die. This is because the gap between the struck part 60 and the hook part 61*b* becomes a thickness on the die side.

In contrast, the present embodiment has a configuration in which the hook part 61*b* hooked to the lower surface of the head 5 is sandwiched between an outer peripheral surface of the shell 1 and the head 5, and the hook part 61*b* is pressed against the shell 1 side by the head 5. Accordingly, even if the gap (length of the insertion part 61*a*) between the struck part 60 and the hook part 61*b* is formed wider than the thickness of the head 5, movement of the hook part 61*b* can be restrained by the shell 1 and the head 5. Accordingly, the unstable operation of the struck part 60 as described above can be suppressed while the rubber hoop 6 can be relatively easily formed by die molding.

Furthermore, by fitting the anchor 61 into the outer peripheral side of the shell 1, the struck part 60 can be accordingly arranged on the outer edge side of the upper surface (region serving as the striking surface) of the head 5. Accordingly, a large region serving as the striking surface of the head 5 can be secured, and the vibration of the head 5 generated when the head 5 is struck can be prevented from being hindered by the struck part 60.

By sandwiching the hook part 61*b* between the shell 1 and the head 5, while the rubber hoop 6 can be stably attached, the anchor 61 is likely to be damaged if the hook part 61*b* is excessively pressed and crushed by the head 5. Hence, in the present embodiment, a notch 43 for accommodating the hook part 61*b* is formed in the curved part 42 of the frame 4.

The notch 43 is formed by cutting off an outer edge portion (portion facing the outer peripheral surface of the shell 1) of the curved part 42 in a rectangular shape. The notch 43 is arranged in the circumferential direction at the same intervals as the plurality of anchors 61 (see FIG. 1 for the point that the notch 43 is rectangular and so on). By accommodating the hook part 61*b* in the notch 43 like this, the hook part 61*b* can be prevented from being excessively pressed and crushed (or excessively pulled downward) by the head 5 in the case where tension is applied to the head 5. Accordingly, damage to the anchor 61 can be suppressed.

In this way, by sandwiching the hook part 61*b* between the shell 1 and the head 5, the unstable operation of the struck part 60 can be largely controlled. However, for example, if a gap is formed between the struck part 60 and the hoop 7, there is a risk that the struck part 60 may rattle or skid as described above. When such an unstable operation of the struck part 60 occurs, problems such as deterioration of a feeling of striking at the time of striking the struck part 60, generation of noise due to contact between the struck part 60 and the hoop 7, and wear of the head 5 or the struck part 60 occur.

In contrast, in the present embodiment, the gap between the struck part 60 and the hoop 7 is filled by a protrusion 62 protruding from an outer peripheral surface of the struck part 60. The protrusion 62 is an annular protrusion extending over the entire circumference of the struck part 60, and is formed integrally with the struck part 60.

By bringing the struck part 60 into contact with an inner peripheral surface of the hoop 7 via the protrusion 62, rattling or skidding of the struck part 60 that occur when the struck part 60 is struck can be suppressed. Accordingly, the problems such as deterioration of the feeling of striking and generation of noise as described above can be suppressed.

Here, in the present embodiment, since the protruding part 61*c* of the anchor 61 protrudes downward from the hook part 61*b*, when the head 5 is placed on the upper end portion of the shell 1, there is a risk that the protruding part 61*c* may be hooked on the inner peripheral side of the shell 1 (the curved part 42 of the frame 4). If tension is applied to the head 5 with the protruding part 61*c* hooked on the inner peripheral side of the shell 1, the anchor 61 sandwiched between the head 5 and the curved part 42 of the frame 4 is likely to be damaged, and proper application of tension to the head 5 becomes less likely.

In contrast, in the present embodiment, the whole of the parts 61*a* to 61*c* of the anchor 61 is inclined downward from the lower surface of the struck part 60 toward the outer peripheral side (left side in FIG. 3 and FIG. 4). Accordingly, when the head 5 is placed on the upper end portion of the shell 1, the protruding part 61*c* can be prevented from being hooked on the inner peripheral side of the shell 1. Thus, the anchor 61 can be prevented from being sandwiched between the head 5 and the curved part 42 of the frame 4. Accordingly, damage to the anchor 61 can be suppressed, and tension can be properly applied to the head 5.

In the state in which the head 5 and the rubber hoop 6 are attached to the shell 1, a lower end of the protruding part 61*c* is located below an upper end of the head frame 50. Accordingly, by inserting a finger into a gap between the shell 1 and the head frame 50 and touching the protruding part 61*c*, it can be confirmed whether the protruding part 61*c* is correctly inserted between the shell 1 and the head frame 50 (whether the protruding part 61*c* is hooked on the inner peripheral side of the shell 1 as described above). Accordingly, it can be prevented that tension is applied to the head 5 with the protruding part 61*c* hooked on the inner peripheral side of the shell 1.

When tension is applied to the head 5, the attachment hole 51 of the head 5 is displaced so as to slide toward the outer peripheral side (radially outside). For this reason, for example, if the opening dimension of the attachment hole 51 in the radial direction is the same as a dimension of the insertion part 61*a* (plate thickness of the anchor 61), when tension is applied to the head 5, the insertion part 61*a* and the hook part 61*b* hooked on an edge of the attachment hole 51 may be pulled to the outer peripheral side. Thus, the anchor 61 becomes likely to be damaged.

In contrast, in the present embodiment, since the thickness of the anchor 61 (insertion part 61*a*) in the radial direction is smaller than the opening dimension of the attachment hole 51 in the radial direction, even if the attachment hole 51 slides toward the outer peripheral side (radially outside) when tension is applied to the head 5, the insertion part 61*a* and the hook part 61*b* of the anchor 61 can be prevented from being pulled to the outer peripheral side. Since the hook part 61*b* expands from the insertion part 61*a* to both circumferential sides, even if the thickness of the anchor 61 in the radial direction is smaller than the opening dimension of the attachment hole 51, the hook part 61*b* can be hooked to the lower surface of the head 5.

In the state in which the rubber hoop 6 is attached to the shell 1, since an inner edge of the struck part 60 is located on the inner peripheral side of an inner edge of the attachment hole 51, the entire attachment hole 51 can be covered from above by the rubber hoop 6 (struck part 60). Accordingly, since the attachment hole 51 can be prevented from being exposed in the region serving as the striking surface of the head 5, an appearance of the percussion instrument 100 can be improved.

Although the disclosure has been described above based on the above embodiment, it can be easily inferred that the disclosure is not limited in any way to the above embodiment, and that various improvements or modifications may be made without departing from the spirit of the disclosure.

In the above embodiment, the case has been described where the percussion instrument 100 is an electronic percussion instrument. However, the rubber hoop 6 may be attached to the head 5 of an acoustic percussion instrument (drum). As an example of a structure of the acoustic percussion instrument, a configuration is adopted in which the sensors 2 and 3 and the frame 4 supported on the inner peripheral side of the shell 1 are omitted, and the upper end portion of the shell 1 is directly covered with the head 5.

In the above embodiment, the case has been described where the head frame 50 of the head 5 is pressed downward by the hoop 7. However, the disclosure is not necessarily limited thereto. For example, a configuration may be adopted in which a through hole is formed in the head frame 50, and the tension bolt B1 inserted into the through hole is fastened to the lug 8 (the hoop 7 is omitted).

That is, in a percussion instrument in which the head 5 that covers at least an opening of the body part is provided and tension is applied to the head 5, it is possible to attach the rubber hoop 6 described in the above embodiment. Accordingly, the structure of the body part or the structure of attaching the head 5 to the body part (applying tension) is not limited to that of the above embodiment.

In the above embodiment, the case has been described where the head 5 is composed of two heads, namely the upper head 5*a* and the lower head 5*b*, and the attachment hole 51*a* of the upper head 5*a* is formed larger than the attachment hole 51*b* of the lower head 5*b*. However, the disclosure is not necessarily limited thereto. For example, there may be one head 5 or three or more heads 5, and the attachment hole 51*b* of the lower head 5*b* may be formed larger than the attachment hole 51*a* of the upper head 5*a*. If a plurality of heads 5 overlap, the attachment holes of the plurality of heads 5 may be of the same size. Although the case has been described where the attachment holes 51*a* and 51*b* have the same opening dimension in the radial direction, the attachment holes 51*a* and 51*b* may have different opening dimensions in the radial direction.

Although the case has been described where the attachment holes 51*a* and 51*b* are rectangular long holes in which the opening dimension in the radial direction is larger than the opening dimension in the circumferential direction, a configuration may be adopted in which the opening dimension in the circumferential direction is the same as (or smaller than) the opening dimension in the radial direction of the attachment holes 51*a* and 51*b*. The shape of the attachment holes 51*a* and 51*b* may be other polygons or a circle, instead of a rectangle.

That is, if the hook part 61*b* can be hooked to the lower surface of the head 5, the opening dimension in each direction or shape of the attachment holes 51*a* and 51*b* can be set as appropriate.

In the above embodiment, the case has been described where the attachment holes 51*a* and 51*b* are formed in advance before the head 5 (upper head 5*a* and lower head 5*b*) is molded with a die. However, the disclosure is not necessarily limited thereto. For example, the attachment holes 51*a* and 51*b* may be formed at the same time in a state in which the upper head 5*a* and the lower head 5*b* overlap after the head 5 is molded with a die.

In the above embodiment, the rubber hoop 6 made of rubber has been illustrated as an example of an elastic body. However, the disclosure is not necessarily limited thereto. For example, the elastic body (rubber hoop 6) may be formed using other known materials used for the purpose of reducing impact or sound during a strike, such as elastomers.

In the above embodiment, the case has been described where the inner edge of the struck part 60 is located on the inner peripheral side of the inner edge of the attachment holes 51*a* and 51*b*. However, the inner edge of the struck part 60 may be located on the outer peripheral side of the inner edge of the attachment holes 51*a* and 51*b*.

In the above embodiment, the case has been described where the parts 61*a* to 61*c* of the anchor 61 are formed in a plate shape in which the radial dimension is smaller than the circumferential dimension. However, the disclosure is not necessarily limited thereto. For example, the whole of the parts 61*a* to 61*c* of the anchor 61 may be formed in a shaft shape (rod shape having a circular or polygonal cross section).

The case has been described where the hook part 61*b* expands from the insertion part 61*a* to both circumferential sides. However, the hook part 61*b* may be expanded from the insertion part 61*a* to both radial sides, or the hook part 61*b* may be expanded from the insertion part 61*a* in two directions, namely the circumferential direction and the radial direction. It is also naturally possible to expand the hook part 61*b* in a direction inclined to the radial direction.

The case where the inclined plane 61*e* is formed by obliquely notching the lower end of the side surface 61*d* of the hook part 61*b*, that is, the case where the hook part 61*b* is formed in a tapered shape as approaching the lower end side thereof, has been described. However, the dimension of the hook part 61*b* in the circumferential direction may be constant from the upper end to the lower end. A configuration may be adopted in which the inclined plane 61*e* is extended and connected to the protruding part 61*c* (the lower surface 61*f* of the hook part 61*b* is also inclined toward the protruding part 61*c*).

The case has been described where the whole of the parts 61*a* to 61*c* of the anchor 61 is inclined downward from the lower surface of the struck part 60 toward the outer peripheral side. However, a configuration may be adopted in which the whole of the parts 61*a* to 61*c* of the anchor 61 extends along an up-down direction. It is also possible that only the protruding part 61*c* is inclined downward toward the outer peripheral side, while the insertion part 61*a* and the hook part 61*b* extend along the up-down direction.

The case has been described where the protruding part 61*c* or the protrusion 62 is formed in the rubber hoop 6. However, the protruding part 61*c* or the protrusion 62 may be omitted. That is, the specific shape of the rubber hoop 6 (anchor 61) is not limited to that of the above embodiment if the hook part 61*b* can be hooked to the lower surface of the head 5. If the shape of the rubber hoop 6 (anchor 61) is changed from that of the above embodiment, the shape of the attachment holes 51*a* and 51*b* may be appropriately set according to the shape of the rubber hoop 6 (anchor 61).

In the above embodiment, the case has been described where the hook part 61*b* is sandwiched between the outer peripheral surface of the shell 1 and the head 5. However, the attachment hole 51 may be formed in a portion of the head 5 located on the inner peripheral side of the shell 1, and the anchor 61 may be fitted into the attachment hole 51.

In the above embodiment, the case has been described where the lower end of the protruding part 61*c* is located below the upper end of the head frame 50 in the state in which the head 5 is attached to the upper end of the shell 1. However, the disclosure is not necessarily limited thereto. For example, in the said state, the lower end of the protruding part 61*c* may be located above the upper end of the head frame 50 (below the lower end of the head frame 50).

In the above embodiment, the case has been described where the anchor 61 is formed on the lower surface of the struck part 60 (the insertion part 61*a* is connected to the lower surface of the struck part 60). However, the disclosure is not necessarily limited thereto. For example, a configuration may be adopted in which the anchor 61 is formed on a lower surface of the protrusion 62 (the insertion part 61*a* is connected to the lower surface of the protrusion 62).

In the above embodiment, the case has been described where the protrusion 62 continuous in the radial direction is formed on the outer peripheral surface of the struck part 60 and the protrusion 62 is brought into contact with the inner peripheral surface of the hoop 7. However, the disclosure is not necessarily limited thereto. For example, the protrusion 62 may be formed intermittently along the radial direction, or the thickness of the struck part 60 in the radial direction may be increased overall to bring the struck part 60 into contact with the hoop 7.

What is claimed is:

1. An elastic body adapted to be attached to a percussion instrument, the percussion instrument comprises a body part and a head, the body part having an opening on an upper end side thereof, the head covering the opening of the body part and having a plurality of attachment holes formed therein, wherein the elastic body comprises:

a struck part, arranged on an upper surface of the head;

a plurality of insertion parts, protruding downward from the struck part; and a hook part, formed to expand from each of the plurality of insertion parts, wherein each of the plurality of insertion parts is inserted into each of the plurality of attachment holes to thereby attach the struck part to the head, and in the attached state of the struck part to the head, the hook part is hooked to a lower surface of the head.

2. The elastic body according to claim 1, wherein the hook part is formed in a tapered shape as approaching a lower end side thereof.

3. The elastic body according to claim 2, further comprising a protruding part that protrudes downward from the hook part and guides insertion of the hook part into each of the plurality of attachment holes.

4. The elastic body according to claim 1, wherein the hook part is sandwiched between an outer peripheral surface of the body part and the head.

5. The elastic body according to claim 1, wherein a dimension of each of the plurality of insertion parts in a radial direction is smaller than a dimension of each of the plurality of attachment holes in the radial direction; and the hook part expands from each of the plurality of insertion parts to both sides in a circumferential direction.

6. The elastic body according to claim 5, wherein, in the attached state, an inner edge of the struck part is located on an inner peripheral side of an inner edge of each of the plurality of attachment holes.

7. A head adapted to be attached to a percussion instrument, the percussion instrument comprises a body part having an opening on an upper end side thereof, the head covering the opening of the body part, wherein the head comprises a plurality of attachment holes; and the head is able to attach an elastic body that comprises a struck part arranged on an upper surface of the head, a plurality of insertion parts protruding downward from the struck part and inserted into each of the plurality of attachment holes, and a hook part formed to expand from each of the plurality of insertion parts and hooked to a lower surface of the head.

8. The head according to claim 7, wherein the head is composed of at least an upper head having an upper surface serving as a striking surface and a lower head laid under the upper head; and each of the plurality of attachment holes of either of the upper head and the lower head is formed larger than each of the plurality of attachment holes of the other of the upper head and the lower head.

9. The head according to claim 8, wherein each of the plurality of attachment holes of the upper head is formed larger than each of the plurality of attachment holes of the lower head.

10. A percussion instrument, comprising:

a body part, having an opening on an upper end side thereof;

a head, covering the opening of the body part and having a plurality of attachment holes formed therein; and an elastic body attached to the head, wherein the elastic body comprises:

a struck part, arranged on an upper surface of the head;

a plurality of insertion parts, protruding downward from the struck part; and a hook part, formed to expand from each of the plurality of insertion parts, wherein each of the plurality of insertion parts is inserted into each of the plurality of attachment holes to thereby attach the struck part to the head, and in the attached state of the struck part to the head, the hook part is hooked to a lower surface of the head.

11. The percussion instrument according to claim 10, further comprising a frame and a curved part, the frame being supported on an inner peripheral side of the body part, the curved part being formed on an outer edge of the frame and hooked on an upper end of the body part; and the hook part is accommodated in a plurality of notches formed in the curved part.

12. The percussion instrument according to claim 10, further comprising a hoop that presses downward on a head frame that is connected to an outer edge of the head, wherein the elastic body further comprises a protruding part that protrudes downward from the hook part and guides insertion of the hook part into each of the plurality of attachment holes; and in the attached state, a lower end of the protruding part is located below an upper end of the head frame.

13. The percussion instrument according to claim 12, wherein the protruding part is inclined downward toward an outer peripheral side of the struck part.

14. The percussion instrument according to claim 10, wherein the hook part is formed in a tapered shape as approaching a lower end side thereof.

15. The percussion instrument according to claim 10, wherein the hook part is sandwiched between an outer peripheral surface of the body part and the head.

16. The percussion instrument according to claim 10, further comprising a hoop that presses downward on a head frame that is connected to an outer edge of the head; and in the attached state, the struck part contacts the hoop.

17. The percussion instrument according to claim 10, wherein a dimension of each of the plurality of insertion parts in a radial direction is smaller than a dimension of each of the plurality of attachment holes in the radial direction; and the hook part expands from each of the plurality of insertion parts to both sides in a circumferential direction.

18. An attachment method of an elastic body in a percussion instrument, the percussion instrument comprising a body part having an opening on an upper end side thereof, a head covering the opening of the body part and the elastic body attached to the head, the elastic body comprising a struck part arranged on an upper surface of the head, a plurality of insertion parts protruding downward from the struck part, and a hook part formed to expand from each of the plurality of insertion parts, wherein the attachment method of the elastic body comprises:

hooking the hook part to a lower surface of the head by inserting each of the plurality of insertion parts into a plurality of attachment holes formed in the head.

* * * * *